US011327775B2

(12) United States Patent
Santos (10) Patent No.: US 11,327,775 B2
(45) Date of Patent: May 10, 2022

(54) METHOD FOR RECORDING AND PLAYING BACK A MEDIA-SYNCHRONIZED USER BROWSING SESSION

(71) Applicants: Geoffrey Fouvry, Rio de Janeiro (BR); Marcus Santos, Rio de Janeiro (BR)

(72) Inventor: Marcus Santos, Rio de Janeiro (BR)

(73) Assignee: Graphcall, Inc., Middietown (DE)

( * ) Notice: Subject to any disclaimer, the term of this patent is extended or adjusted under 35 U.S.C. 154(b) by 0 days.

(21) Appl. No.: 16/477,116

(22) PCT Filed: Jan. 11, 2017

(86) PCT No.: PCT/BR2017/000002
§ 371 (c)(1),
(2) Date: Jul. 10, 2019

(87) PCT Pub. No.: WO2018/129598
PCT Pub. Date: Jul. 19, 2018

(65) Prior Publication Data
US 2019/0361717 A1    Nov. 28, 2019

(51) Int. Cl.
*G06F 3/14* (2006.01)
*H04L 67/148* (2022.01)
*G06F 9/451* (2018.01)
*G06F 3/0484* (2022.01)
*G06F 9/50* (2006.01)
*H04N 5/76* (2006.01)

(52) U.S. Cl.
CPC ............ *G06F 9/451* (2018.02); *G06F 3/0484* (2013.01); *G06F 3/1454* (2013.01); *G06F 9/5027* (2013.01); *H04L 67/148* (2013.01); *H04N 5/76* (2013.01)

(58) Field of Classification Search
CPC ...... G06F 9/451; G06F 3/0484; G06F 9/5027; H04N 5/76
See application file for complete search history.

(56) References Cited

U.S. PATENT DOCUMENTS 8,566,718 B1    10/2013  O'Neill
9,531,825 B1 *  12/2016  Brooks ............... G06F 3/04842
(Continued)

OTHER PUBLICATIONS

International Search Report for PCT/BR2017/000002 dated Mar. 31, 2017.

*Primary Examiner* — Beau D Spratt
(74) *Attorney, Agent, or Firm* — Lorraine Hernandez; Kegler Brown Hill + Ritter (57) ABSTRACT

The present invention describes a web application having a module formed by a recorder sub-module responsible for recording and a player sub-module responsible for playback. When the recording is initialized, a process is started to capture the media, listen and record certain application events thrown as a result of the user's navigation, to record the application state just before such events occur, to record a time/date for each of such events, so that the actions taken in the application along with audio and video capture can be played back later in synchrony. During playback, even if the user assisting to the playback pauses, rewinds, forwards or interacts with the elements of the application at any moment during the execution of the playback or while in pause, the playback will reproduce the state of the application and the actions taken by the user during the recording.

20 Claims, 7 Drawing Sheets

(56) References Cited

U.S. PATENT DOCUMENTS

| | | | |
|---|---|---|---|
| 9,716,861 B1* | 7/2017 | Poel | H04N 7/15 |
| 2007/0015118 A1 | 1/2007 | Nickell et al. | |
| 2011/0173239 A1* | 7/2011 | Sayed | G06F 11/3414 |
| | | | 707/821 |
| 2012/0089905 A1 | 4/2012 | Chafy et al. | |
| 2013/0067020 A1* | 3/2013 | German | H04L 67/14 |
| | | | 709/213 |
| 2014/0240440 A1* | 8/2014 | Seo | H04M 1/7253 |
| | | | 348/14.03 |
| 2015/0149557 A1* | 5/2015 | Mendez | H04L 67/141 |
| | | | 709/205 |
| 2015/0278534 A1* | 10/2015 | Thiyagarajan | G06F 21/84 |
| | | | 726/28 |
| 2017/0070559 A1 | 3/2017 | Myers et al. | |
| 2017/0249068 A1* | 8/2017 | Mahajan | H04L 67/10 |

\* cited by examiner

METHOD FOR RECORDING AND PLAYING BACK A MEDIA-SYNCHRONIZED USER BROWSING SESSION

This application is the U.S. national phase of and claims priority to International Application PCT/BR2017/000002, filed on Jan. 11, 2017, herein incorporated by reference.

FIELD OF APPLICATION

The following invention relates to record and playback systems as well as audio and media files.

BACKGROUND OF THE INVENTION

The runtime environment in web browsers such as Javascript, Java and Flash along with modern front-end frameworks such as Angularjs, React, JQuery, among others, have fostered the development of many web applications. A large amounts of existing web applications are client applications that are downloaded remotely from the server through the browser and executed in an embedded runtime environment installed in the web browsers. These applications provide users with rich interfaces, which interact with remote servers and download media available through the Internet.

The sophistication of these applications has increased the need for help sections and tutorials for the user to understand how to use these applications and perform specific tasks. The current methods of tutorials provided to explain how to use an application are generally in two categories. In the first case, it consists of text and images of the application, in order to explain the sequence of steps for the user to be able to perform a certain task. The first method requires the user to read the text that explains how to use the application, which can be long and laborious. The second type of tutorials involves a video capture of the application running, while at the same time an audio/video file is recorded from the webcam or microphone. This audio/video records the tutor explaining what steps are required to perform a given task. The video stream from the screen capture on one hand and the webcam or microphone stream are then typically merged in a single video stream, so that the narrator appears in a small corner overlaying the application video capture in the background, or is simply heard speaking in the case of a microphone-only stream capture.

This second method is simply a video coming from the merger of different stream. The second method is usually easier for the user than the first, but requires running on two different browser windows to follow the steps. The live application runs in one window while the video tutorial in another. The user will usually need to pause in the tutorial window and return to the live application window to perform the steps explained in the video tutorial. This process would happen from side to side, from the tutorial window to the application window, in order to reproduce in the application the steps explained.

STATE OF THE ART DOCUMENTS

U.S. Pat. No. 7,330,887 B1, "Method and system for testing web-based applications" describes a way of recording a series of events with a timer, however, this document differs from the present invention because it does not include the ability to playback, nor the ability to record media files (audio and video) in any form or fashion, via the webcam or other peripheral.

US 2007/0106692 A1, "System and method for recording and replaying a session with a web server without recreating the current session" describes how to record a web session for help and support purposes and has the ability to playback the recording. This document differs from the present invention because it listens to user input events and metadata. In this American document, the system functions as a receiver of data packets, recording what is in the packet, which means that the data passed through GET, PUT, POST and other verbs of the HTTP protocol are analyzed. In the present invention, the recorder sits within the application, which means that all events can be recorded from the application regardless of whether there are data transferred between the server or not, not to mention that the present invention is not restricted to data exchanged with a server. Also, the method in this American document records the metadata of the packets exchanged in a session and uses these metadata to reproduce the session without having to re-create it. The present invention is capable of recording all the events of the application, not only the metadata of the packet that is exchanged between the application and the server and in fact the present invention reproduces the session in perfect synchrony with the audio/video files captured with Webcam or other devices. Recording media files is a separate recording process from the session recording but working in synchrony. In other words, all events can be recorded in the present invention if they are parameterized. In synchrony to the events recording, there is also a recording of the media files (audio and video). During the playback, the user actions that have been parameterized are replicated, however the webcam is not performing the same task as it did in the recording phase, the webcam does not replicate again a recording. During the playback, the Webcam does nothing, instead the media recorded through the Webcam is played back in synchrony with the replay of the user actions.

US 2002/0065912 A1, "Web session collaboration," describes a method of monitoring the interactions of a web application on the server side. This method does not record the actions that happened in the browser without a connection, that is, without interacting with the server, nor is there any media (audio or video and audio) files synchronized with the navigation involved in that patent. In the present invention, there can a recording of the action of a scroll for example, or of a highlight on a PDF document, or any other action that do not even involve any transaction with a remote server.

U.S. Pat. No. 7,529,798 B2, "System and method for recording and playback of collaborative web browsing session", describes a method capable of recording the screen capture of the application for later reproduction, differing from the present invention, which records a representation of the behavior of the application for each user's action. The American document discussed records the screen capture for certain regions of the user's screen whereas the present invention records actions within the application in the form of commands and in synchrony also records the audio and video files via a webcam or other devices in order to reproduce later the actions performed by the user in the application synchronously with the media files captured during the recording.

US 2011/0173239 A1, "Web Application Record-Replay System and Method", describes a device capable of recording user actions and proposes to reproduce them. This document differs from the present invention due to the absence of recording of application state for each action as well as the absence of media files recorded in synchrony with the user actions during the session. Recording media files is also different from the capture of user actions. In playback, the present invention does not repeat the action of recording the media files again, in the session playback, the Webcam does nothing. Instead, the media that has already been recorded will be played back in synchrony with the replay of the application session.

BRIEF DESCRIPTION OF THE INVENTION

A web application contains a module consisting of a recorder submodule and another module which is the player submodule (for playback). The process consist in listening and recording certain application events emitted according to the user's navigation, and recording the application state for each event recorded along with a timestamp. When a recording is initialized, the process of capturing media is also initialized in synchrony. This way, the actions taken by user in the application together with the audio and video capture can be played later in synchrony, and the state of the application can be properly checked and restored for each action reproduced in the replay.

The module interacts with the webcam or the camera and the microphone if installed separately on the machine, in order to capture the media to be played back later. The recorder sub-module interacts at the same time with the events thrown by the application to indicate which type of event should be recorded while the media file are recorded synchronously. These events are represented in the form of commands. For each captured event, the command, application state, and date/time are recorded so that even if the user would pause and interfere in the application during the pause, the record and playback would be resumed properly. By activating the playback process, the module retrieves data from the storage service, which contains the commands, media files, application state for each event, and the date/time generated during the recording process. This is done in order to reproduce the navigation sequence recorded by the user synchronously with the audio and/or video files, but also to check and restore the application state for each event reproduced. The user can go forward or backward in playback mode. The user can also browse and interact with elements of the application while the recording or playback process is interrupted or paused, and can even interact with application at the same time that the playback mode is running.

DETAILED DESCRIPTION OF THE INVENTION

One or more embodiments of the present invention provides methods for recording certain application events in a list of commands along with the application state for each event and the date/time when they occur in synchrony with a recording of a media stream via webcam, microphone or other devices. These events, their related application states, and the related date/time (timestamps) are stored in a file along with the media files (which can be separate video and audio files, audio only or video/audio combined into a single file). The media is the audio, or video plus audio recorded in synchrony while the user is running the web session whose events are recorded. The media can be simply the user talking in the webcam explaining what he is doing while running the application or a video capture of a boardroom or any other media stream captured by the media devices. This method allows a person to show how to use an application, or talk and walk through a PDF document with highlights for example, but in playback instead of displaying a video of the application elements, the application is running live as if an invisible user was browsing and taking control of the application's elements. This "invisible user" is in fact shown talking in a floating video-box or variable size, or simply heard as the media is replayed in synchrony. The viewer will then watch the playback of the navigation along with the media files synchronously and can pause the playback at any time, and can use the application live himself on pause in the case of a tutorial of application instead of having to open two windows (one being the video of the tutorial, the other the live application) as previously described. The recorded session can be used to present important points in the navigation and teach the user how to locate the data, or to walk through a PDF document with highlights for example, and again on pause the PDF document can be read on its own as the viewer takes control of the application again. In one embodiment of the present invention, a web application contains a module containing two submodules. The first sub-module is the recorder sub-module that interacts with the browser's execution environment to intercept events that were previously and selectively parameterized in order to be captured. These events correspond to data inputs received by the web application, such as user inputs, remote server entries, and operating system inputs (for example, timer, alarm events, etc.) in which the browser execution environment is running. The recorder sub-module also captures the application state for each event and interacts with the webcam or other audio and video device in order to capture the media files to be synchronized with the user's navigation. In playback, the stored files are read by the second sub-module, which is the player sub-module. Playback is performed on the basis of the stored data file to simulate the previously selected input events that occurred during the recording session following the same time sequence, while the audio and video files are played synchronously with the commands/events.

The global module can be divided into two submodules: first, the recorder submodule; second, the reproduction submodule. The first submodule accesses the user's camera and microphone and captures the media files. It also listens to events that have been parameterized to be captured. When these events are launched by the application, from the action of the user 220, from the responses of the server 225 or even from entries from the operating system 215, the commands are captured. Each command represents a user-specific action in the application (or navigation). Together with the commands, the application state is also recorded for each user action in order to ensure consistency in playback mode. Also a timestamp is captured for each action captured. At the end of the recording, the navigation files obtained along with the media files are made available in the memory (RAM) for the user to replay and decide if they are of adequate quality to be sent to the storage service or if they are to be destroyed because the recording was not satisfactory.

The global module also contains a second sub-module responsible for replaying the recording (or player sub-module). The process begins with the user activating the playback of a previously recorded recording. The recorded files may be in RAM when the user has just completed a recording but has not yet uploaded those files to the storage service. The user can also play back a recording previously captured and stored in the storage service (his own recording or a recording made by another user). Once the media files have been loaded together with the commands, the application states for each command and date/time of these events, the module starts the playback process, managing the synchronization between the media files and the commands. Objects representing the applications states are maintained for each command item originating from the recording process and are used to verify that the current application conditions are adequate for executing the commands. If they are not, the module can use the recorded state and correct the current state of the application. In other words, if the current state of the application is not compatible with running the current command (due for example to user interactions during a pause), the state is changed to the state stored along with the command.

Figure 1:
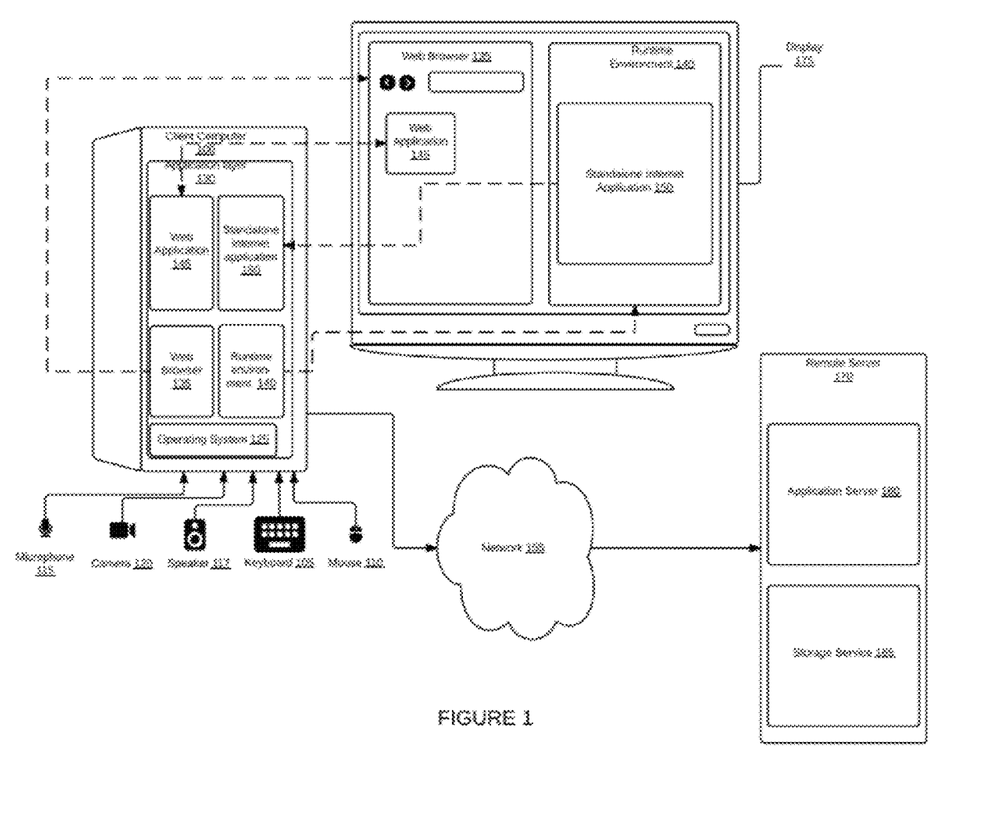
FIG. 1 represents the block diagram of the environment of a web application.

FIG. 1 represents the block diagram of the environment of a web application. On the client side, a computer 100 is coupled to (or includes) a keyboard 105, a mouse 110, a speaker 117, a microphone 115, and a camera 120 or combined microphone and camera (webcam) to capture the user inputs, as well as user audio and video media streams captured during the session. Operating system 125 of client computer 100 supports an application layer 130 including one or more software (s) such as an Internet browser 135, with built-in execution environment for programming platforms such as javascript, java, Flash, and the like (for example, installed via downloaded plug-ins and similar techniques, etc.). The application layer also includes a stand-alone runtime environment, such as the runtime environment 140 for such programming platforms (for example, Java Runtime Environmment (JRE), Adobe Integrated Runtime (AIR), and the like). In one embodiment, a web application 145 is downloaded from a web site through the web browser 135 and is presented as a web page inside the runtime environment embedded in the browser. For example, a user can load a web page in Internet browser 135, whose URL points to an .swf file (that is, Flash Player file). In this example, the Web application 145 is downloaded as a .swf file and displayed on a Web page through the Flash execution environment (also known as Flash Player virtual marchine of the Flash Player) that has been installed in the Internet browser 135. Alternatively, a standalone runtime environment such as the runtime environment 140, can support a stand-alone Internet application 150 that operates outside the confines of the Internet browser 135, but offers the same functionalities or similarities of a web application 145. In either case, the portions of the web application 145 or standalone Internet application 150 (e.g., graphical user interfaces, etc.) are displayed in the Internet browser 135 or in the runtime environment 140, respectively, in a monitor 175 that is coupled to the computer 100.

The web application 145 communicates over a network 155, such as the Internet, with an application server 160 that runs on a remote server 170 and receives data and other content from the application server. As used herein, references to the web application 145 will also apply to the autonomous internet application 150, given their similarities. In addition, in the illustration of FIG. 1, a storage service 165 is provided by the remote server 170. The data can be retrieved later by the application 145 as detailed below. Before the storage service is activated, the application provides the session files and the media files in memory in the runtime environment 140. The commands (session events recording), the application states, and the timestamps objects are in memory in a non-serialized format together with the audio and video files. This data is available in memory first so that the user can verify that the recorded session is adequate. If the recorded session is of adequate quality, the user may send the data to the storage service 165. The content of the data saved in the storage service 165 consists of the media files, which may be the audio file, audio files, and video, or a single combined audio/video file, along with commands, application states, and date/time for each command, as will be described later. The storage service 165 may be provided as a service within the application server 160, or as an independent service within the remote server 170, (as shown in FIG. 1). It should be noted that in other embodiments, the storage service 165 may be in another location, including, for example, a remote server or a client computer 100.

Figure 2:
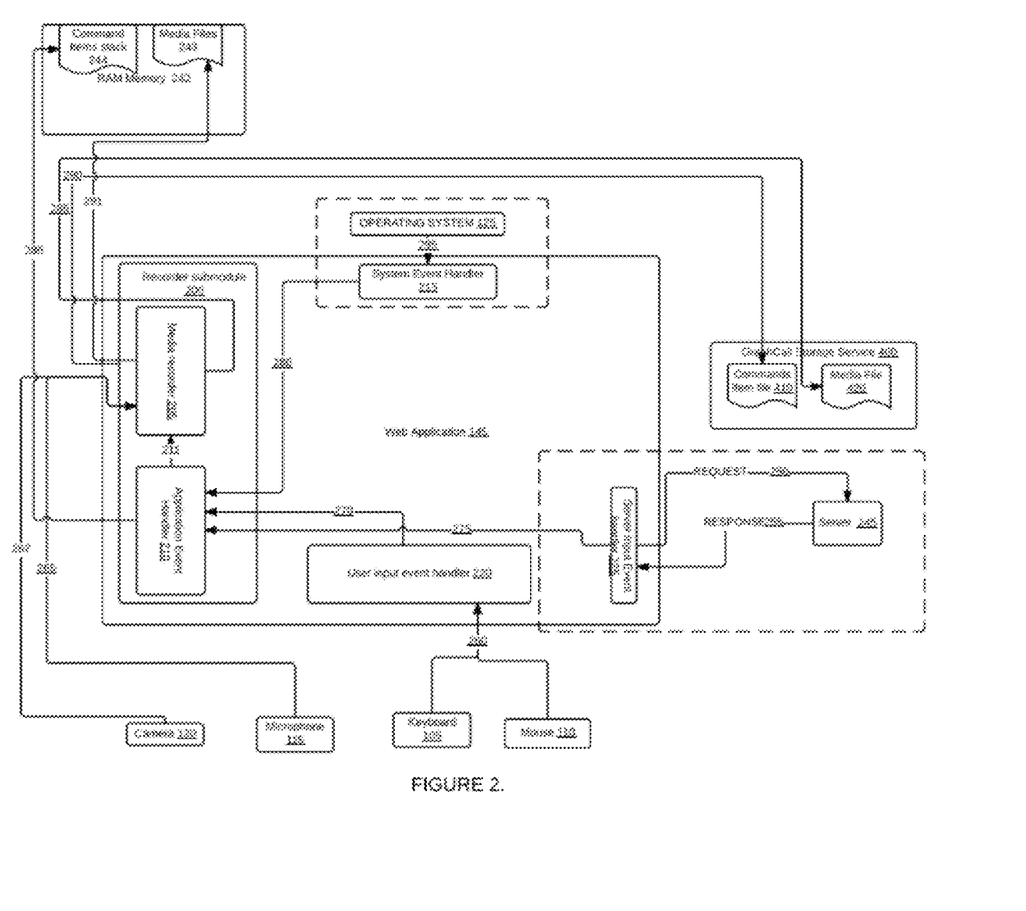
FIG. 2 shows the block diagram of the recorder sub-module.

FIG. 2 illustrates the recording process of the recorder sub-module, which is the first sub-module, as a block diagram formed by components of an application and the interaction of the components within the application environment. Since many of the execution environments in which this explanation applies are based on programming platforms that fall under the paradigm of object-oriented programming (eg Java, ActionScript for Flash, etc.), the explanations presented here will use such a paradigm for the description. However, the functionality described for the web application 145 may be written using procedural programming or any other existing programming language paradigm. The recorder sub-module 200 is responsible for recording the session and the media files. The process initializes with the user requesting a session and media recording, with the keyboard 105 and mouse 110 requesting the web application 260 and generating event inputs from the user 220 in order to initialize the recording process. The application 145, via path 270, requests the application event handler 210 within the recorder sub-module 200 to start the recording process.

When the process is started, the application captures events that are triggered as the user interacts with the application through the keyboard 105 and mouse 110. These events 220 are transmitted to the recorder sub-module 200. At the start of recording the session, an event captured in 220 and passed to the recorder submodule 200 triggers the opening of a small window within the application which shows the current capture of the video together with an interface with buttons and/or other visual elements. The user interacts with this interface to trigger the start of the recording. At this point, the submodule begins to listen to the application events that have been chosen and parameterized to be processed (the others are ignored). We call these events "application events" because they are not standard events in the browser execution environment, they are custom events designed to implement the solution described in the present invention.

The web application 145 dispatches additional events which the recorder sub-module 200 listens to, if activated. The recorder sub-module receives those events in its application event handler 210 and upon reception of those, execute a sequence of more steps. The user input event handler 220 listens to the interaction between the user and the application using the path 260, with the ability to send events in turn to the application event handler in the recorder sub-module 210 via path 270. The processing those events will depend on whether a particular action performed by the user has been parameterized to be listened to by the recorder sub-module. A certain subset of events generated by the user are parameterized to be listened to in the recorder sub-module. In the event that a given event is parameterized, the application forwards a new event, a specific event to the recorder sub-module with all the information it needs, as already mentioned: the command, the state of the application just before the event, and the date/time. This specific architecture could be different and could include a direct listening of the user input event through the recorder sub-module, but the separation provides a better way to organize the responsibilities and filter out certain events according to the context. When the user requests the start of the recording process, the recorder sub-module 200 requests access to the microphone 115 and the camera 120 which can also be a webcam by combining the microphone and video capture in a single device. If the system is connected to a camera and microphone and these devices are available, and if the user allows access to the camera and the microphone, the recorder sub-module will then start recording the audio and video. The media files may be separate files or a single combined file, which will be received by two streams 265 and 267 and received by the media recorder 205.

The events captured are thrown by the application and allow the recorder sub-module to be notified in its application event handler 210 that a particular action has occurred, upon which the recorder sub-module 200 will be triggered to perform a particular sequence of specific actions. As the user performs particular actions in the application, user input events are dispatched which will be captured by the user input event handler 220. The application captures these events from the browser's runtime environment. If, for example, there is a particular event coming from the execution environment and if this event has been listened to by the user input event handler 220, another event is then sent to the application event handler 210 and the recorder module executes a certain action upon receipt of this "application event". In this way, the application sends different events to the recorder sub-module, which can result in recording a command (explained in FIG. 4), or start recording or stop recording, for example. The user input event handler listens to the user interaction with the application. For example, if the user clicks on a button, selects an element, closes a tab, all of which are considered user inputs. The application event handler is inside the recorder sub-module. As certain actions are performed in the application, interaction and processes occur between components within the application, and in this particular case will trigger application events that are listened to by the recorder sub-module. These include, for example, an event that represents the addition of an element on the screen, or an event representing the removal of an element on the screen, and so on. As the application throws events, the recorder sub-module listens to them and performs a given action as soon as it receives them. The application passes events from the runtime environment, the server and the system (as well as the user). In the case of the server, it can return data that can result in elements appearing on the screen, for example. At this point, the application can throw an event, which if the recorder sub-module is listening, will result in the recorder sub-module recording the command to be reproduced later. The process is selective, depending on which events have been parameterized in advance to be listened to. The recorder sub-module will listen only to events that have been parameterized, ignoring the others. The parameterization can include all events and all actions. The recorder sub-module can be configured to listen to all these events, or simply to listen to particular events and ignore a zoom action that is not considered important in a given context for example. What is deemed necessary can be recorded selectively. The recorder sub-module also captures the content from the microphone and the camera. In turn, the recorder sub-module, takes the streams from the camera and microphone, and records them. After the user has stopped the recording, upon request by the user, the recorder sub-module sends the media files along with the navigation commands to the storage service.

An event is received by the recorder sub-module application event handler 210 together with the command (explained below) which is a set of instructions for reproducing the actions taken by the user, for example displaying a visual element on the screen or selecting an item in a list. Upon receiving the events along with the command items, the recorder sub-module has the information necessary to record the action so that later, in playback mode, it can display a particular visual element on the screen or select an item from a list. A concrete command implements the Command interface that has an "execute" method and some necessary and command-specific settings. The command object contains a model (or receiver) and a configurations object, which are necessary to reproduce the desired context and the particularities of the execution of a particular action when the command is executed, synchronously with the media files. The model (or receiver) is the object that actually contains the instructions needed to execute the task when the execute method of the command is invoked. The receiver has all the specific instructions to perform a certain task. Since the actions performed by the user in sequence differ, each action will have a different model (receiver). A specific application state is required for the command's action execution. The configuration object which records the state of the application is used to make sure that this particular state is satisfied prior to executing the command. For example, when the user presses enter, the application takes the specific id of the selected element, makes a request to the remote server, retrieves the content returned by the server, and with that content follows other steps to display a visual element on the screen. All steps required to perform this particular action can be encapsulated within the execute method of the command responsible for performing this particular action. Then, instead of performing the steps one-by-one to perform the action, a command is created that has an execute method which contains the steps necessary to perform that specific action. The execute method of this command calls the model (or receiver) which will be explained later.

An action that has not been structured in the form of a command within the application can not be part of the actions registered in the recorder sub-module. In summary, the application needs to be reformulated following the Command design pattern for each action to be parameterized. A proper mapping of the actions which need to be recorded is necessary. These actions need to be broken down and implemented following the Command design pattern. Once this process has been done each time the user executes an action, the action performed by the user will trigger the creation of a command, which contains the model (or receiver) and its necessary configurations and will then call the "execute" method of this command, at that instant, an event thrown to the recorder sub-module. When an application event that has been parameterized for recording is thrown, in case the recorder submodule is in the process of recording events, the recorder submodule receives this event, saves this command along with the timestamp in order to later retrieve this specific command and then calls its execute method and thus performs the action. When the recording starts, the recorder sub-module initiates the listening to the events, which allows the recorder sub-module to receive the command object, an object that holds the state of the application prior to the execution of the action and the timestamp. The previous state of the application allows to save the necessary elements to reproduce the actions properly. The recorder sub-module at this point creates a command item, which contains a command with its necessary settings to play the right instance of the model (or receiver), for proper execution during the playback process. The command item also contains the date/time and the object with the application state at the time. There are cases where the action may already have happened, which is particularly applicable for third party libraries. In this case, the action has already been performed. In this case, an event handler has been parameterized to capture the event that indicates that the action was performed, capturing at the same time the object that was just created with its appropriate settings and parameters. In this case, a command is created post the execution and the creation of the command does not trigger execution, an event is simply triggered and a command item is recorded by the recorder submodule without any execution resulting from the creation of that command, since the execution has already occurred.

As mentioned earlier, when initializing the recording, the recorder sub-module initializes the listening to "application events" that were previously parameterized, but when the user pauses or stops recording, the sub-module stops listening for these events during these application states of pause or stop. In those states, with the recorder sub-module stopped or paused, the application continues to throw the same events forward as they occur. However, the recorder sub-module is selective, and while it is paused or stopped, the recorder sub-module interrupts the listening to the events required to capture the session, but continues to listen to the events required for the user to interact with the recorder sub-module interface to resume the recording after a pause, for example, or to submit the completed recording to the storage service. When the user submits the recorded files to the storage service, this storage can be local, on the same application server or even on another server. The recorded session consists of a list of command items along with the media file(s) and can both be in memory (RAM) or in a storage service, as already mentioned. When the recorded session is submitted to the storage service, the list of command items is first serialized. If it is in RAM, it resides in the browser, within the browser's running environment.

Figure 3:
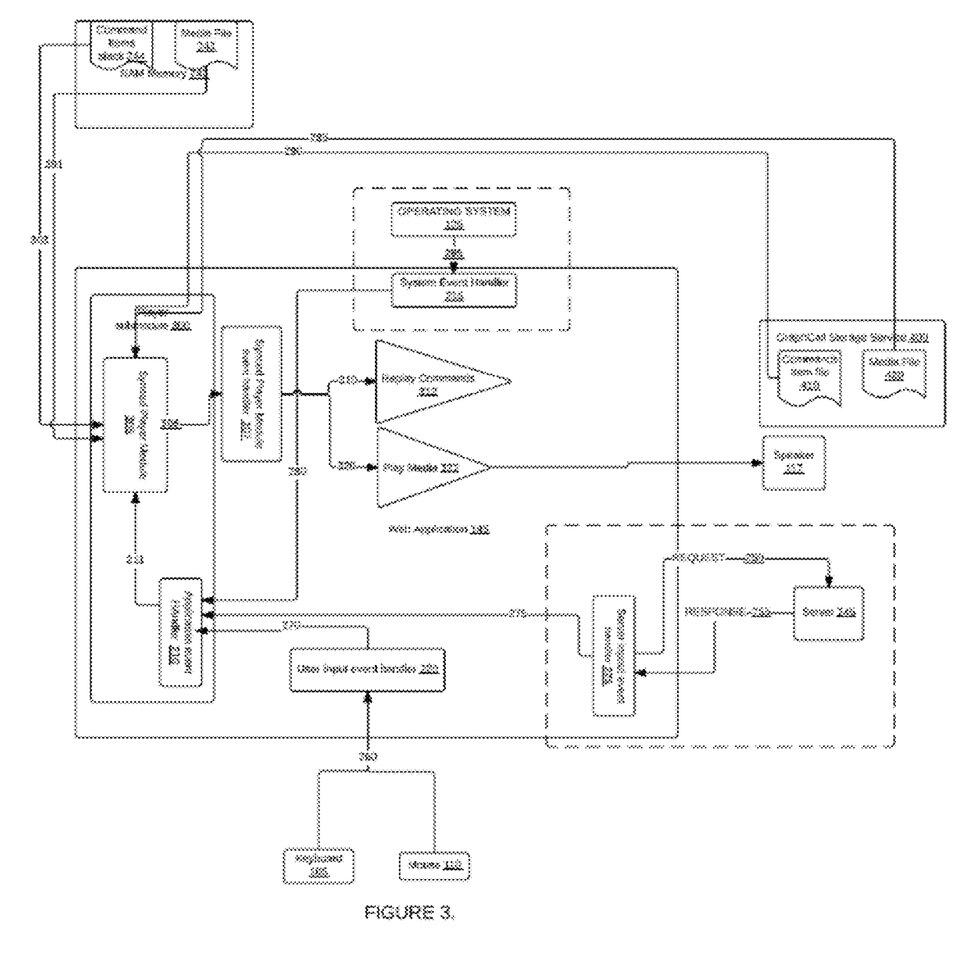
FIG. 3 represents the block diagram of the player (reproduction) sub-module.

FIG. 3 illustrates the block diagram of the reproduction sub-module. Out of the application we have a 117 speaker that is connected to the computer. The user navigates through the application through the interface elements that allow that user to choose a recording that was previously saved. The player sub-module 300, more specifically the synchronous player sub-module 305, obtains the id of a recording previously made and loads both the recorded media files together with the command items file that has been stored in the storage service 400 or if the file is still in memory, taken from the RAM 242. The synchronous player module 305 will receive the data, de-serialize the command items if they are serialized (explained in FIG. 4) and load the media files. In the case of command items, the synchronous player module loads the complete set of commands before starting playback, but in the case of the media files, the synchronous player module 305 downloads small parts at a time in order to the start immediately without having to wait for all the media files to be downloaded so that the execution can start quickly. Each command item in the list of stored command items is an object that contains a command itself, a date/time object that was captured when the action occurred, and the object with the state of the application at the time of recording that command. The list of command items will be in a serialized format when they are obtained from the storage service, but the available objects will already be "in memory" when retrieved from the RAM in case a recording has just been performed and has not yet been submitted to the service of storage. When the list of command items is retrieved from the storage service, the module de-serializes these command items and then initializes the playback of the media files in a synchronous manner with the commands. The synchronous player module takes video and audio and ensures that both files play in perfect synchrony together with the execution of the commands. Various combinations can be applied, for example, media files of audio and video can be recorded together in a single file and stored as such and then retrieved in the same way. Another alternative would be to send the audio and video files separately to the server, then convert those files into a single synchronized file and retrieve the file that was compressed and combined from the server during the player process. These methods attenuate the need for synchronization efforts on the side of the synchronous player module, it should be emphasized that all the approaches presented are possible.

Obtaining the files from RAM instead of the storage service happens just after a given user has completed a recording. When the user completes a recording, the recorder sub-module provides the user with both the media files and the list of command items as objects in memory (RAM). At this point, the user can play the recording in order to test if the result is of satisfactory quality, both considering the playback of session actions and the playback of audio and video files. If the result of the recording is satisfactory, the user can then submit them to the storage service.

The execution of the commands that is administered within the player sub-module is done in the following manner the player sub-module schedules the executions of the commands. The synchronous player sub-module calculates in 305, picking each command item in sequence and checking the time difference between the date/time of this item against the time of the first command item (the first command item is a meta command item explained in FIG. 4) less the accumulated time of pauses that happened during the recording until the timestamp of the item processed. The time difference obtained through this calculation is used to schedule the execution of a given command from the start of the execution. For example, the player sub-module would execute a given command in X amount of time from the start of execution. It is important to note that this schedule controls the execution of commands. This schedule does not merely schedules the execution of commands. Each command item contains the object that holds the state of the application before its execution. This object is used to ensure that the execution of the command happens correctly. Because the user can pause playback of a given session recording and then interact directly with the application by changing its state, some objects in the application can be removed or simply changed by the user making the application state inconsistent with the state required to execute the command when the user decides to resume the execution of the replay. Therefore, the object with the state of the application immediately before the execution of the action of this command becomes necessary to correct the application state.

Once the execution of the commands has been scheduled and the time comes to execute a given command, the synchronous player sub-module inspects whether the current state of the application is consistent with the state necessary for the execution of the command. It compares the state of the current application with the state recorded in the command item. If the application state is inconsistent, the system removes the relevant elements in the application, takes the elements that have been registered in the command item from the recorded application state, and injects these elements into the application, thus correcting the state of the application. The module schedules the commands in order to manage the timely execution synchronously with the media files so that the media files and the playback session are in perfect synchrony. While the user is watching the session recording, he can pause the execution, move forward or even rewind. In playback mode, the module does not listen to recording events, but listens to other events such as the event of pause of the playback, the stop event, the forward and backward events, for example. If the viewer of the playback takes control of the application and navigates while the player is paused or even playing, the navigation events are sent forward, but the module will not be hearing those events in that state. It should be noted that although we are describing the solution for the case of a web application, this invention is not restricted to such a type, it can be applied within the scope of a desktop application, mobile applications such as mobile phones and tablets or web as described herein.

Figure 4:
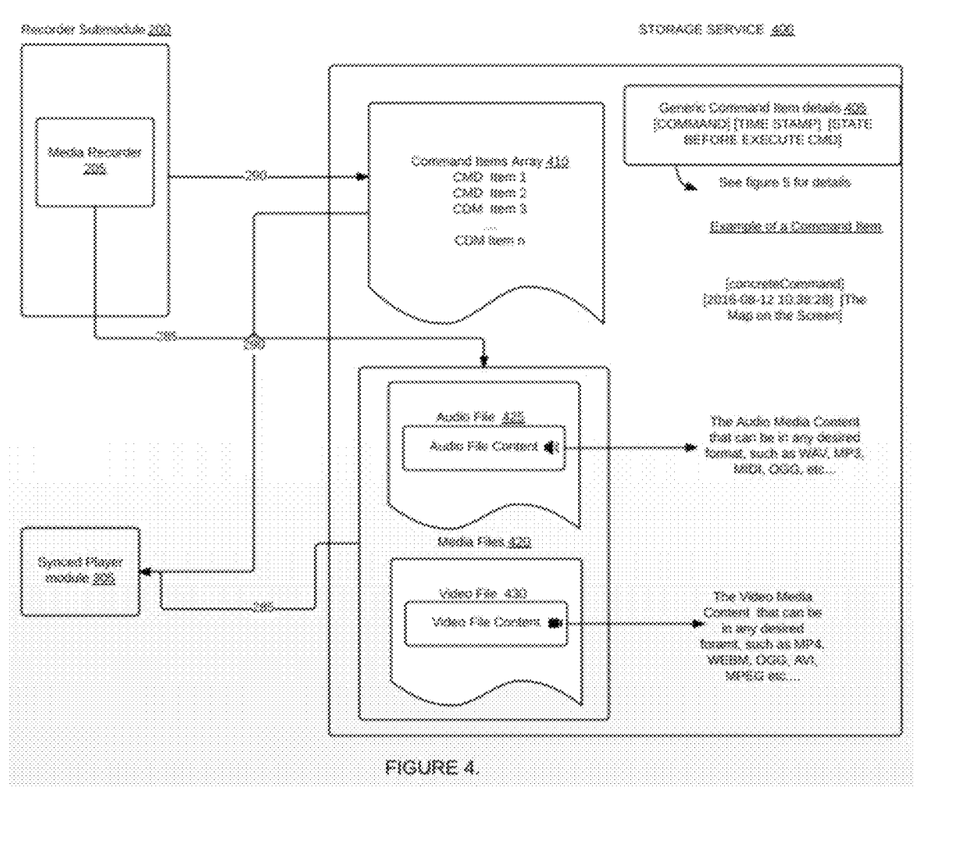
FIG. 4 represents the exemplified structure of the storage service.

FIG. 4 illustrates the storage service. Before talking about the details of the illustration, it is worth remembering the general purpose of the storage service. This is where the media files and command items are stored when the session recording has completed and has been submitted to be saved. The storage service may be part of the application server, which has been deployed on the server machine or can be separate or even be deployed on another machine. For the purposes of this invention, those alternatives do not make a difference.

Storage service 400 is a persistence storage service for the command items to be stored in serialized format together with the media files so that both can be retrieved for later playback. We can divide the stored content in two parts: The media files on one side 420 and the file containing the list of the serialized command items on the other side 410. The command items are stored in a vector, stack, or list, which can be then reconverted to "in memory objects" in the synchronous player module 305 in order to reproduce the user navigation sequence 312 which they represent along with the audio and video in synchrony 322. All the user actions or only some that have been previously parameterized which were recorded by the recorder sub-module, are translated into command items or meta command items, as the user navigates through the application. In the playback process, the module can perform the exact same actions or actions similar to the actions performed by the user during the recording, as the case may be.

When an object command is created, it is encapsulated within a command item 405, along with the application state and date/time of that action. The system stores a list of serialized command items 410 through the recorder sub-module 200. The command items in their serialized form store the type of command they represent and the data required to recreate the command instance with the appropriate characteristics. There are two different types of commands at their core. On the one hand, there are commands whose purposes are solely to carry out actions in the application. These commands in their serialized form contain the command type and an object that holds the variables so that it can be recreated as the original. On the other hand, meta commands are just "strings" that are used to express, for example, the beginning of the recording. In this case, the command item that stores this meta command "start" would also store the date/time and the state of the application equally to the previous type, differing only in that the command object in this case is a simple string indicative of the action. We can cite other meta commands like the "pause" and the meta command "stop" which are essential for the pause, resume and end functionality of a recording.

The deserialization process of the commands consists in taking the serialized list of command items from the storage service and rebuilding each command. Variables and objects are recreated from the serialized list of command items, and a new command instance is created from each item in that list. To recreate a command instance, the module checks the type of the command for each item in order to know which constructor will be needed to rebuild the object and so the command objects are recreated again. In order to instantiate the commands in their proper form, the command configurations kept with each command in serialized form are used by the constructor in order to recreate an object with the same characteristics as during the recording. After the command items have been de-serialized, each will be scheduled for execution 305. The player sub-module, takes this list and schedules for execution the list of commands at the proper time for execution. Audio and video are the media files. Media files may be separate if they are recorded separately. But they can be combined on the server or not to form a single file or they can be left separate to be played later. If they are left in separate files, during the playback process, both will need to be manipulated to be synchronized. The present invention operates with the media files separately or arranged in a single file.

Figure 5:
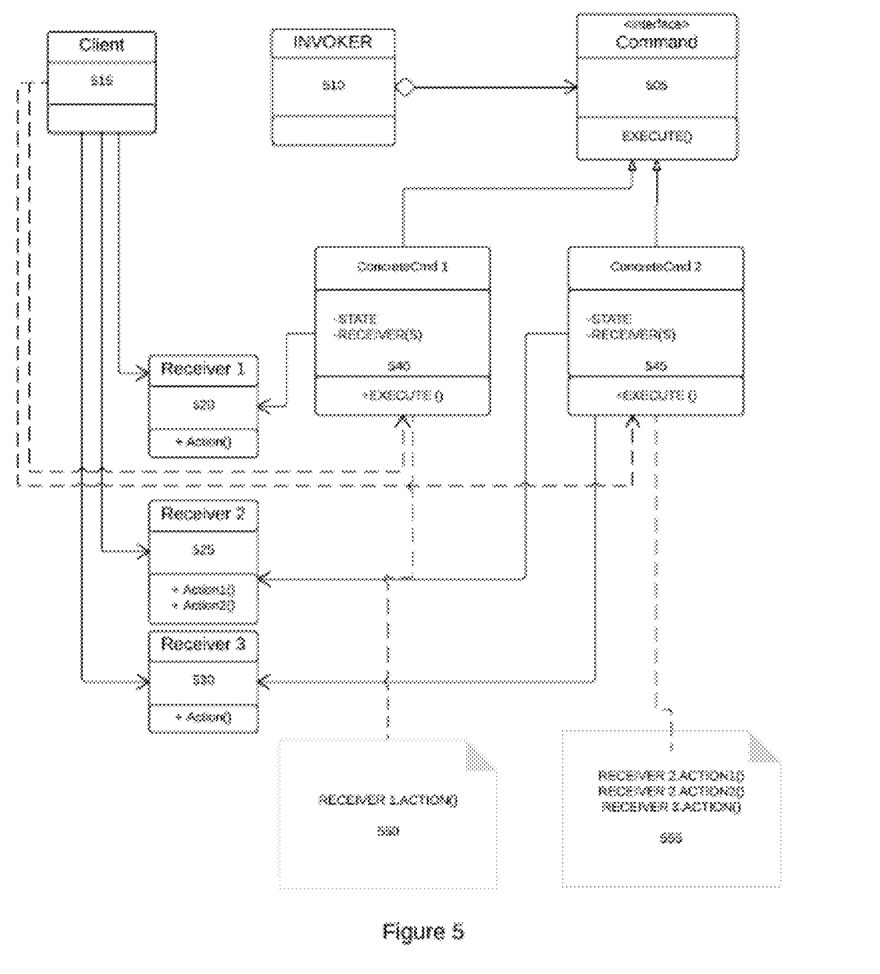
FIG. 5 represents an example of the command design pattern (Command Design Pattern UML)

FIG. 5 illustrates a representation of the Command design pattern. During recording, the recorder sub-module listens to the "application events" that have been parameterized. And as they occur, the sub-module stores the various command items in a list for later playback. The general module, among other functions, assumes the role of invoker 510 when the playback mode is started, retrieving the list of command items and executing each one at the right time.

The execute method 540-555 is the action that a concrete command will execute when prompted to do so. It should be noted that the execute method of a given concrete command (540 or 545) may call a single method of a given receiver (520, 530 and 540) or call more than one method on a single receiver 550 or even call many methods of different receivers 555 belonging to a given particular command 545.

In fact, both the recorder sub-module and the player sub-module implement, among other functionalities, the widely known command pattern design. In fact, the application is responsible for the creation of the concrete commands. In the application, the concrete commands are created and sent with the events, which in turn are processed in the recorder sub-module. Within a concrete command, there are one or more receivers, which are the models that actually perform the task. For example, the task of displaying an "alert" box in the application could be the responsibility of a specialized model who knows all the steps to perform such a task. In fact, the receiver is an abstraction, so the implementation of the task execution itself is not within the Concrete Command. The Concrete Command (540 or 545) does not implement the execution itself, but has the appropriate methods to call the model (or receiver) to perform the action (550 or 555). This way the Concrete Commands delegate the execution of the task to the models or receivers.

The Concrete Command also stores a variable or object that holds the state of the application. This variable stores the state of the application immediately before the execution of the action that is represented by this Concrete Command. This variable or object allows the player sub-module to evaluate whether the application context is appropriate to perform the action. Otherwise, the player sub-module can force the application to use the state of the application stored in this variable and thus ensure proper execution of the command without errors or inconsistencies. This variable does not belong to the standard Command pattern, but has been added within the scope of this invention.

Figure 6:
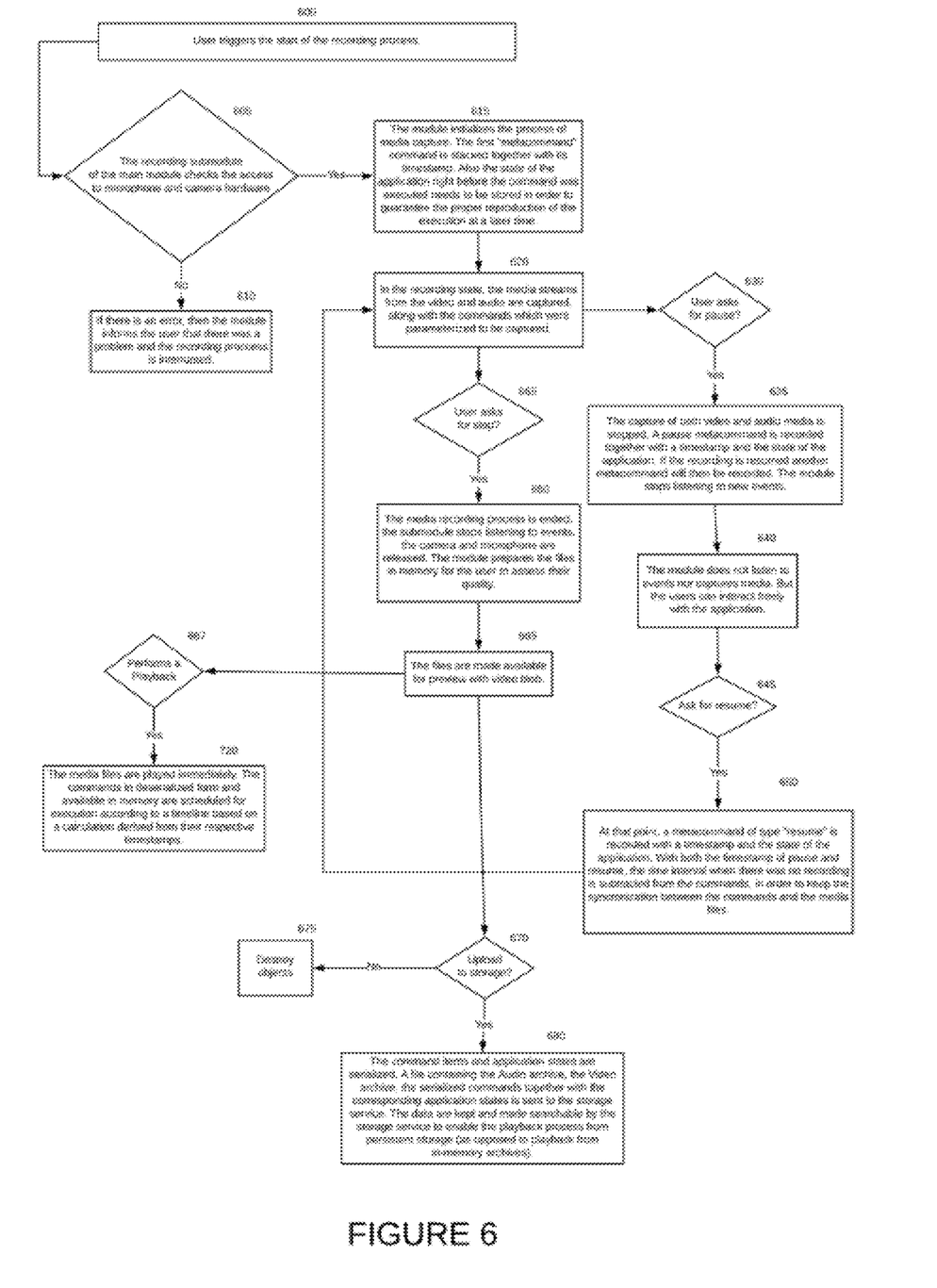
FIG. 6 shows an example of a flow chart for recording certain events of a browsing session synchronously with the media (audio and video) files.

FIG. 6 Represents the flowchart of the steps required to record a session of a web application with the media files in a synchronous manner. At step 600 the user triggers the start of the recording process by the submodule 200; At step 605, the media recorder checks if it has access to the hardware of microphone 115 and camera 120. If there is an error, then the module informs the user that a problem has occurred and the process is interrupted. Otherwise, if the hardware is available, then the module initializes the video and audio capture process 615 which may be the audio file only, the audio and video file separately or even the combined audio and video files from the microphone and/or the camera. The first meta command item is added in the list to indicate the start of the process. This command item has a type which is a "start" command, a date/time object, indicating when the recording started and also an object with the initial state of the application. The module then initializes the listening to the events that were parameterized, storing the user session commands that were thrown by the application. The object with the application state needs to be stored to make sure that the commands can be executed properly later. Then, the recorder sub-module changes its state to the "recording" state. In the "recording" state 620, the video and audio media streams are captured, along with the command items that have been parameterized. All captured command items are recorded with the command type, a date/time object, and the object that represents the state of the application. The type is needed to know what type of action a given concrete command represents, as each type represents a specific action. At this point, the user can interact with the recorder sub-module in two ways, and can either ask the process to pause or can ask the process to stop. If the user triggers a pause 630, process 635 is triggered. In the process of pausing 635, the module stops capturing both video and audio media and stops listening to the application events. The module registers a meta command item of type "pause", with a date/time object and the state of the application. Later, when the application restarts the recording process after a pause, another meta command of the type "resumed" will be recorded with its own date/time object and its state of the application, similarly to other meta commands. The listening to the events application is restarted. This will allow to calculate how long the recording was stopped in playback mode. This is done, so that in playback mode, we can ensure the synchronization of the media files with the execution of the commands. The recorder sub-module stops listening for new application events while in sleep state 640. In short, the recorder sub-module does not listen to events nor does it capture media in this state, however the user can freely interact with the application in this state. In this state (pause), the user can also choose between two possible actions: finish the recording at 655 or resume the recording. If the user triggers the stop of the recording 655, the module changes to state 660. In this state, the process of recording media files is interrupted. The recorder sub-module stops listening to the application's events and releases access to the camera and microphone. The module then provides the result of the recording in memory for the user to assess quality. When the in-memory files are ready, they are available at 665 for playback, in order for the user to check if they are of satisfactory quality. The user can then decide to submit the files to the storage service in 670 or discard them. If the user decides to discard the files, the objects in memory are destroyed in 675. If, on the other hand, the user decides to save the recording to 680, the in-memory objects containing the command items are first serialized and together with the audio and video are sent to the 400 storage service. The data are kept and made searchable in the storage service at 680 so that the playback process can retrieve those (as opposed to the reproduction of the data in memory). In contrast, if the user requests to resume recording at 645, then the submodule moves to 650. At that point, a meta command item "resume" is recorded, containing a date/time object and an object with the application state just prior to this action. The time interval in which there was no recording (paused time) is calculated by subtracting the time intervals between the "pause" and "resume" meta commands. This is done in order to maintain synchronization between commands and media files. The state of the application is always written to know if the commands are executable at the time they are called. When the user pauses the recording, it can modify the state of the application, and this new state must be taken into account for the commands that will be recorded after the pause, since the state before the pause may be incompatible with the commands recorded after the resumption of the recording. The state of the application, when the user resumes the recording, must be registered to be used in case the state modified by the user does not allow the execution of the commands. Then, the sub-module listens to application events again and the submodule changes its state to "recording" 620.

Figure 7:
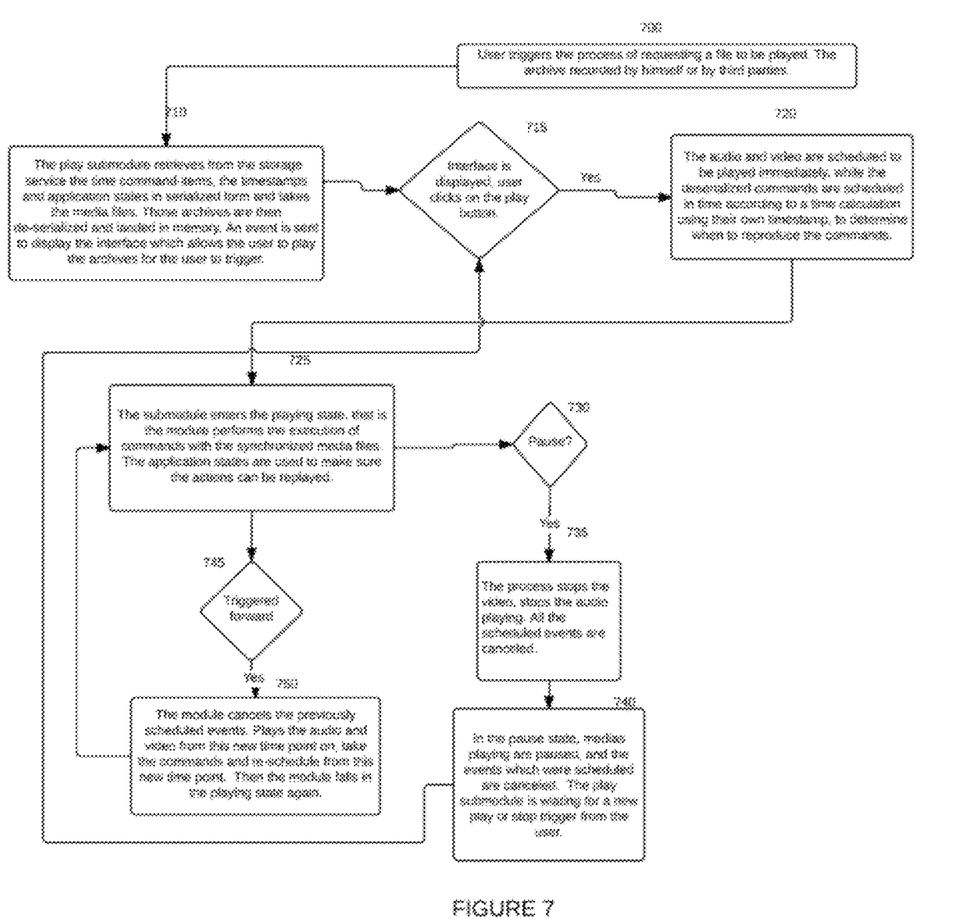
FIG. 7 is an example of a flow chart for reproducing a previously recorded session synchronously with the media (audio and video) files.

FIG. 7 represents the flowchart of the playback of a recorded session together with the media files. At 700, the user accessing the application interface selects a file to play. The file may have been recorded by the user himself/herself or by a third party. The player sub-module at 710 verifies which files the user wants to play and if they are available. The player sub-module makes a request to the storage service 400 and takes the media files and the list of command items, which contains the command itself, application states and date/time objects for each item, in a serialized format. These command items are then de-serialized and loaded into memory. Once the files have been de-serialized and loaded, an event is issued to display the interface that allows the user to play the files. At 715 the user can start the playback process. The current time at which the playback starts at 715, is used and forwarded to the initial scheduling process 720 along with command items; the media files are also transmitted to the module. The scheduling process instructs the module to play the media files from the time chosen with the timebar user-interface for forwards and rewind purposes. The point of time chosen using the time bar is passed from 715 to 720, then the media is played at this point of time together with the commands from that new point of time onwards. If the execution time of a given command is after the new point of time, the command will be scheduled, otherwise it will be ignored. The module uses the stored date/time for each command, minus the start date/time of the recording, minus the amount of time that the recording was paused to figure out when to schedule the command execution. For quality control purposes, moments after a session recording has been stopped, the media files, the commands, their application states and the date/time (s) are made available for immediate playback at 715. The recording can be discarded if it does not meet expectations of the user or can be sent to the storage service by the user as previously described. The player sub-module then enters the playback state 725, that is, the module executes the actions of the commands following the schedule together with the media files in perfect synchrony. The player sub-module, for each command to be executed, checks whether the state of the application is compatible. If it is not, the player sub-module uses the state of the application recorded in the command item to adjust the necessary conditions. The user then has two options. The first one is to request the 730 pause. The "pause" process 735 stops the execution of the media files (audio and video). All executions of commands that have been scheduled are canceled. The player sub-module enters the paused state. The second option is to rewind or forward the playback. If a request to move forward or backward at 745 occurs, the player sub-module enters the rescheduling process at 750. The module cancels execution of the previously scheduled commands. The player sub-module reproduces the media files from this new point in time, picks up the commands and resets them from this new point. After the request of forward or rewind has occurred throughout the visual interface and If the execution time of a given command is located after the new chosen point of time, the command will be scheduled, otherwise it will be ignored. Then the sub-module enters again the playback state 725.

What is claimed:

1. A method for recording and replaying user-synchronized browsing session with media comprising the steps of:
   a. definition or parameterization of events to be captured;
   b. reformulation of a source code to follow a command design pattern for each action to be parameterized;
   c. recording of command items;
   d. interaction with webcam;
   e. creation of meta commands;
   f. time coordination of media files with commands generated by a user's navigation during a recording process in order to reproduce a synchronous reproduction of the navigation with the media;
   g. provision of the recording process;
   h. serialization of a list of command items;
   i. deserialization of the list of command items;
   j. provision of the media files to be synchronized with a session playback;
   k. scheduling execution of the meta commands; and
   l. initiating the playback by restoring an application state wherein the user can go forward and backward during the playback.

2. The method as claimed in claim 1, wherein the definition or parameterization of the events to be captured further comprises selected events which are sufficient to reproduce the session in a satisfactory manner, which can vary for each particular case depending on a particular application, including high-level application events, such as user-generated events, server-generated event and operating-system-generated events.

3. The method as claimed in claim 1, wherein the reformulation of the source code is performed so that certain user input events, server inputs and operating system inputs are selectively passed by the application as application events so that they are listened to, recorded and stored in the list of command items.

4. The method as claimed in claim 1, wherein the recording of command items, which have a particular command object and other data, is required to recreate this command in a proper manner after they were serialized.

5. The method as claimed in claim 1, wherein the recording inside the command items of the command object along with an object representing the state of the application before the action is to be executed, is performed to get a consistent behavior at the time of playback, and finally that the recording along the commend items of a date and time object is also performed to mark the exact moment of the action.

6. The method as claimed in claim 1, wherein the interaction with the webcam has the purpose of recording input stream of the webcam.

7. The method as claimed in claim 1, wherein the creation of meta commands has the purpose of enabling the user to initiate, pause and resume the recording so that such events are stored in order to exclude the paused time which occurred during the recording.

8. The method as claimed in claim 1, wherein the media files are recorded in a synchronous manner to the recording of commands generated by the user's navigation, allowing to pause both the recording of the media files and the recording of the commands, and allowing to restart the recording of both on the same timeline.

9. The method as claimed in claim 1, wherein the provision of the recording session in memory moments after the user has just stopped the recording lets the user check the quality of the recording by performing an immediate replay.

10. The method as claimed in claim 1, wherein the serialization of the list of command items enables those objects to be represented in a serialized form within a permanent storage system which can be local or remote.

11. The method as claimed in claim 1, wherein the de-serialization of the list of command items and instantiation of new objects is performed based on the received serialized objects.

12. The method as claimed in claim 1, wherein the scheduling of the playback process (a) including the execution of the commands is according to the timestamps of the events captured during recording and adjusted to possible pauses which could have occurred (b) uses a determined point in time within the duration of the playback to (1) begin the playback of the media files in synchronously with the commands, (2) include only the commands to be executed after the point in time chosen.

13. The method as claimed in claim 1, wherein the capture of the media file is stored in temporary memory.

14. The method as claimed in claim 1, wherein the files to be downloaded from the storage service to initiate the execution are identified, which include the files for playback of the session navigation by the user commands and also include the media files to be synchronized with the playback of the session navigation.

15. The method as claimed in claim 1, wherein before each command is executed, a verification is performed to check whether the application is in a consistent state or not, so that the action recorded can be reproduced, where for example the action of a given command is to move an item to the corner of the screen and if the user pauses the playback moment before this command is executed and removes that item from the screen, the application, when resuming the execution of the playback, will need to re-create the item and add it again on the screen, this information being available in the object that stores the state of the application inside the command item; such method operating in connection with the temporal sequence check in order to restart the playback of the media at the right time; such method detecting inconsistencies based on a non-predetermined number of states created through a session recorded by the user randomly.

16. The method as claimed in claim 15, wherein the elements are adjusted in the application so that a suitable execution can be performed if the application is not in a consistent state, which does not interrupt the execution of the application, but corrects the its state in real time.

17. The method as claimed in claim 1, wherein the provision of the actions of "pausing", "rewinding" and "forwarding" the playback of a given recording, enables the reproduction of the session in synchrony with the media, but also enables the cancelation and rescheduling of the commands according to the new point of time chosen in the "forwarding" and "rewinding" actions, and finally enables the media files to be paused and also to resume the playback of the session events from a new point in time chosen by the user, such playback of the session actions with the media playback occurring in synchrony.

18. The method as claimed in claim 1, wherein the method is implemented by computer method to (1) record and reproduce (a) a navigation session (b) in a synchronized manner the capture of video or media (c) all successive states created by user interactions with the application without any limitation of possible combinations, (2) reproduce (a) user browsing session (b) and synchronously the media files (audio and video), (3) detecting any inconsistency of the application state without being limited to a predetermined sequence list, but on the contrary, restoring any sequence of user generated states during the recording, which can take an infinite number of possible combinations, and restoring such states of the application without stopping the application, (4) pause forward and rewind the command sequence responsible for the session playback, while the media replays, pauses, forwards and rewinds to the new point chosen in a synchronous manner.

19. A method for providing an application for recording and replaying user-synchronized browsing session with media, comprising the steps of:
 a. definition or parameterization of events to be captured;
 b. reformulation of a source code to follow a command design pattern for each action to be parameterized;
 c. recording of command items at an application level;
 d. interaction with webcam;
 e. creation of meta commands;
 f. time coordination of separately-generated media files with commands generated by a user's navigation during a recording process in order to reproduce a synchronous reproduction of the navigation with the media;
 g. provision of the recording process;
 h. serialization of a list of command items;
 i. deserialization of the list of command items;
 j. provision of the media files to be synchronized with a session playback;
 k. scheduling execution of the meta commands; and
 l. initiating the playback by restoring an application state wherein the user can go forward and backward during the playback,
 wherein the navigation and the media remain synchronized regardless of user interaction therewith during the playback.

20. The method as claimed in claim 19, wherein the method further provides for:
 a. browsing and interacting with elements of the application while the recording or playback process is interrupted or paused, and
 b. interacting with the application during playback.

* * * * *